United States Patent [19]

Cifuentes et al.

[11] Patent Number: 5,174,813
[45] Date of Patent: Dec. 29, 1992

[54] POLISH CONTAINING DERIVATIZED AMINE FUNCTIONAL ORGANOSILICON COMPOUNDS

[75] Inventors: Martin E. Cifuentes; David B. Selley, both of Midland, Mich.

[73] Assignee: Dow Corning Corporation, Midland, Mich.

[21] Appl. No.: 788,917

[22] Filed: Nov. 7, 1991

[51] Int. Cl.⁵ .......................... C09G 1/00; C09G 1/12
[52] U.S. Cl. .......................................... 106/3; 106/10; 528/26; 528/38
[58] Field of Search .................. 106/3, 10; 528/26, 38

[56] References Cited

U.S. PATENT DOCUMENTS

| | | | |
|---|---|---|---|
| 3,508,933 | 4/1970 | Yates | 106/11 |
| 3,702,769 | 11/1972 | Vaughn | 106/10 |
| 3,817,889 | 6/1974 | Fink et al. | 106/10 |
| 3,817,894 | 6/1974 | Butler et al. | 260/29.2 |
| 3,836,371 | 9/1974 | Kokaszka | 106/11 |
| 3,903,082 | 9/1975 | Berger | 106/3 |
| 3,960,575 | 6/1976 | Martin | 106/10 |
| 4,104,296 | 8/1978 | Pike | 260/448.8 |
| 4,113,677 | 9/1978 | Svedas et al. | 106/10 |
| 4,247,330 | 1/1981 | Sanders, Jr. | 106/3 |
| 4,462,828 | 7/1984 | Otsuki | 528/38 |
| 4,592,934 | 6/1986 | Wolstoncroft | 106/10 |
| 4,600,436 | 7/1986 | Traver et al. | 106/3 |
| 4,743,648 | 5/1988 | Hill et al. | 106/10 |
| 4,810,291 | 3/1989 | Osberghaus et al. | 106/10 |
| 4,883,854 | 11/1989 | Coury et al. | 528/28 |
| 4,898,614 | 2/1990 | Halloran et al. | 106/3 |
| 4,997,478 | 3/1991 | Gordon | 106/10 |
| 5,025,054 | 6/1991 | Yoshida et al. | 524/267 |
| 5,045,584 | 9/1991 | Sasaki et al. | 106/10 |

Primary Examiner—Mark L. Bell
Assistant Examiner—Helene Klemanski
Attorney, Agent, or Firm—Jim L. DeCesare

[57] ABSTRACT

A polish formulation containing as components thereof at least one member selected from the group consisting of waxes, solvents, surfactants, thickening agents, abrasives, dyes, odorants and other ingredients normally used in making polishes. The improvement resides in incorporating into the polish formulation a derivatized amine functional organosilicon compound.

12 Claims, No Drawings

POLISH CONTAINING DERIVATIZED AMINE FUNCTIONAL ORGANOSILICON COMPOUNDS

BACKGROUND OF THE INVENTION

This invention relates to a polish formulation and more particularly to a polish formulation containing derivatized organosilicon compounds which provide a polish having better smear resistance and a reduced tendency to streak.

Polishes are used to produce a glossy finish on a surface as well as to prolong the useful life of the surface. The gloss provided by the polish is the result of components in the polish which leave a coating and that function to smooth and clean the surface. Floor polish, furniture polish, and shoe polish rely upon a deposited film. Car and boat polish formulations result in a glossy and protective film and may contain abrasives for removing weathered paint and soil as well as old built-up polish. Metal polishes contain ingredients for abrasive smoothing of the surface being treated and for surface cleaning as well as components that function to remove and retard the build-up of tarnish.

Motor vehicle polish is specially formulated in order to remove road film and oxidized paint and to provide a continuous glossy film which resists water and its removal by water and car wash detergents. Such vehicle polishes contain several major functional ingredients including an abrasive. The abrasive however must be mild enough to avoid scratching of the painted surface and representative of such mild acting materials are fine grades of aluminum silicate, diatomaceous earth and silica. Straight and branched chain aliphatic hydrocarbons are employed to facilitate the detergency of the polish against oil based traffic soils and debris and provide solvency characteristics necessary in the production of a stable formulation. These hydrocarbons also control the drying rate of the formulation. Wax constitutes another polish ingredient and is one of the two film forming materials in the polish. The wax is spread and leveled and produces a high luster following buffing of the surface. Blends of soft and hard wax are often employed in order to facilitate ease of buffing and durability of the polish against environmental antagonists. Exemplary waxes are paraffin wax, microcrystalline petroleum wax, carnauba wax, candelilla vegetable wax, montan coal derived wax and synthetic polymeric waxes such as oxidized polyethylene.

Silicone materials are included in polishes as the other film forming ingredient. Such silicone materials also function as lubricants for easing the application of the polish as well as its buffing and act as release agents for dried abrasive. The silicone materials spread easily, provide a uniform high gloss and water repellency. Such materials typically are dimethylsilicones however aminofunctional silicone products are also employed. The aminofunctional silicone products result in films having increased resistance to removal from the surface by detergents and the environment as a result of their ability to plate out on a painted surface and to crosslink and bond to that surface.

A car polish may also contain an emulsifier, a thickener, and a stabilizer for the production of a homogeneous stable product of desired consistency. Such polishes may be solid in form, semisolid, presoftened or liquid. The polish can be solvent based or an emulsion and in either case the polish may be a liquid, semi-solid or solid in constitution. Typically liquid emulsions include five to twenty weight percent of an abrasive, ten to thirty-five weight percent of solvent, two to fifteen weight percent of a silicone material and up to about five weight percent wax. In an emulsion paste formulation the wax ingredient is increased in level from three to twenty-five weight percent.

Polish formulations containing organosilicon compounds are not new. For example aminofunctional siloxanes have been employed in polish formulations as shown in U.S. Pat. No. 3,508,933 issued Apr. 28, 1970. Such aminofunctional silicones are also disclosed as ingredients in various polish formulations in U.S. Pat. No. 3,836,371 issued Sep. 17, 1974; U.S. Pat. No. 3,890,271 issued Jun. 17, 1975; U.S. Pat. No. 3,960,575 issued Jun. 1, 1976; U.S. Pat. No. 4,013,475 issued Mar. 22, 1977; U.S. Pat. No. 4,218,250, issued Aug. 19, 1980; and in U.S. Pat. No. 4,898,614 issued Feb. 6, 1990. However, the prior art does not teach the use of the instant derivatized organosilicon compounds in polish formulations.

SUMMARY OF THE INVENTION

This invention is directed to a polish formulation containing as components thereof at least one member selected from the group consisting of waxes, solvents, surfactants, thickening agents, abrasives, dyes, odorants and other ingredients normally used in making polishes. The improvement resides in incorporating into the polish formulation a derivatized amine functional siloxane or silane.

The polish formulation is preferably water based and can be in the form of a water in oil emulsion polish although the polish formulation may also be formulated in the form of an oil in water emulsion polish. The polish formulation includes at least one organosilicon detergent resistant film forming amine functional compound which has been derivatized with either a cyclic ester such as a lactone or a derivative of carbonic acid.

These and other features, objects, and advantages of the herein described present invention will become more apparent from a consideration of the following detailed description thereof.

DETAILED DESCRIPTION

Waxes which may be employed in the polish formulations of this invention are well known in the art and can vary depending on the specific use intended of the polish and the properties being sought. Specific examples of suitable waxes include animal waxes such as beeswax, spermaceti, lanolin and shellac wax; vegetable waxes such as carnauba, candelilla, bayberry, and sugarcane; mineral waxes such as ozocerite, ceresin, montan, paraffin, microcrystalline and petrolatum; and synthetic waxes such as ethylenic polymers, polyol ether-esters and chlorinated naphthalenes.

Abrasives which can be used are well known in the art and suitable abrasives include aluminum silicate, diatomaceous earth, pumice, fuller's earth, bentonite, silica, tripoli, hydrated calcium silicate, chalk, colloidal clay, magnesium oxide red iron oxide, and tin oxide.

There may also be employed in the polish formulation solvents such as VM&P naphtha, Stoddard solvent, naphtha mineral spirits, water, kerosene; surfactants such as polyoxyethylene sorbitan monooleate and fatty alcohol amine sulfates; thickening agents such as soya lecithin and methyl cellulose; detergent resistant additives such as dimethyl and carboxyfunctional silicones;

colorants, odorants, corrosion inhibitors and other ingredients normally used in making polishes. Such ingredients are all well known to the skilled artisan. The invention is applicable to all forms of wax and/or abrasive containing polishes including solvent based polishes, water based emulsion polishes and paste wax polishes.

The detergent resistant additives can be organic polysiloxanes which are film formers having a viscosity in the range of about five to as high as several million centistokes preferably about 100 to about 10,000 centistokes. Preferably a mixture of polysiloxanes having relatively higher and relatively lower viscosities is employed. Such polysiloxanes have the repeating unit

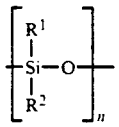

wherein n is an integer having a value greater than one, $R^1$ is an alkyl radical containing 1 to 7 carbon atoms inclusive or a phenyl group, $R^2$ is hydrogen, an alkyl radical containing 1 to 7 carbon atoms inclusive or a phenyl group. Illustrative polysiloxanes encompassed by the above formula are polydimethylsiloxane, polydiethylsiloxane, polymethylethylsiloxane, polymethylphenylsiloxane, polydiphenylsiloxane, diphenylsilanediol and copolymers of any two or more of the foregoing siloxanes. Polysiloxane-oxyalkylene block copolymers may also be utilized.

In addition to the aforementioned organic polysiloxanes, the present compositions may include an aminofunctional polysiloxane. The aminofunctional polysiloxane is a silicone fluid with highly polar pendant aminoalkyl modifying groups that enhance the durability of the film and promote adhesion of the film to a wide variety of substrates.

The present composition also contemplates an optional liquid silane constituent which promotes the mutual solubility of other organic silicone compounds present in the mixture. Suitable liquid silanes are represented by the formula $R'-Si(OR'')_3$ wherein $R'$ can be an alkyl radical containing one to three carbon atoms inclusive or phenyl, and $R''$ can be an alkyl radical containing one or two carbon atoms inclusive. A preferred liquid silane constituent is an alkyltrialkoxysilane such as methyltrimethoxysilane, ethyltriethoxysilane, phenyltrimethoxysilane, and phenyltriethoxysilane.

Aminofunctional siloxane compositions which can be included are represented by the formula:

$$Me_3SiO(Me_2SiO)_x(MeSiO)_ySiMe_3 \quad (I)$$
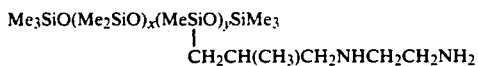

Such compositions are described in U.S. Pat. No. 3,508,933 issued Apr. 28, 1970; U.S. Pat. No. 3,836,371 issued Sep. 17, 1974, and in U.S. Pat. No. 3,890,271 issued Jun. 17, 1975.

In addition to the silicone polymer identified in formula (I) above, the polish formulation in accordance with the present invention includes as the improvement a derivatized amine functional silicone. The derivatized amine functional silicone is the reaction product of either (i) a lactone such as propiolactone, butyrolactone, valerolactone and caprolactone; or (ii) a derivative of carbonic acid such as ethylene carbonate and propylene carbonate; and (iii) an amine functional polysiloxane having the formula

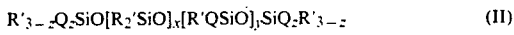

wherein $R'$ denotes an alkyl group of 1 to 4 carbons, OH, an alkoxy group, or a phenyl group, with the proviso that at least 50 percent of the total $R'$ groups are methyl; Q denotes an amine functional substituent of the formula $-R''Z$, wherein $R''$ is a divalent alkylene radical of 3 to 6 carbon atoms or a radical of the formula $-CH_2CH_2CH_2OCH_2CHOHCH_2-$ and Z is a monovalent radical selected from the group consisting of $-NR_2'''$, $-NR'''(CH_2)_nNR_2'''$; and

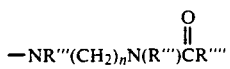

wherein $R'''$ denotes hydrogen or an alkyl group of 1 to 4 carbons, $R''''$ denotes an alkyl group of 1 to 4 carbons and n is a positive integer from 2 to 6; z has a value of 0 or 1; x has an average value of 10 to 3000; and y has an average value selected from the group consisting of (i) y=0 and (ii) y=1-100.

Useful R groups are radicals such as methyl, ethyl, propyl, isopropyl, butyl, isobutyl or phenyl with the proviso that at least fifty percent of the R groups are methyl. The R groups may all be the same or different.

In the formula for the amine functional substituent Q represented by $-R''Z$, the alkylene radicals denoted by $R''$ include trimethylene, tetramethylene, pentamethylene, $-CH_2CHCH_3CH_2-$ and $-CH_2CH_2CHCH_3CH_2-$. Siloxane polymers wherein the $R''$ radical denotes $-CH_2CH_2CH_2OCH_2CHOHCH_2-$ may also be employed. Siloxanes wherein $R''$ is trimethylene or an alkyl substituted trimethylene radical such as $-CH_2CHCH_3CH_2-$ are preferred however.

Z represents an amine radical that may be substituted or unsubstituted. Preferred amine radicals as noted previously include $-NR_2'''$, $-NR'''(CH_2)_nNR_2'''$ and

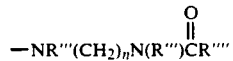

wherein $R'''$ denotes hydrogen or an alkyl group of one to four carbons, $R''''$ denotes an alkyl group of one to four carbons and n is a positive integer from two to six. Alkyl groups of one to four carbon atoms represented by $R'''$ and $R''''$ include methyl, ethyl, propyl, butyl, isopropyl or isobutyl. Useful Z radicals include unsubstituted amine radical such as $-NH_2$; alkyl substituted amine radicals such as $-NHCH_3$, $-NHCH_2CH_2CH_2CH_3$ and $-N(CH_2CH_3)_2$; aminoalkyl substituted amine radicals such as $-NHCH_2CH_2NH_2$, $-NH(CH_2)_6NH_2$ and $-NHCH_2CH_2CH_2N(CH_3)_2$; and aminoalkyl substituted amine radicals such as

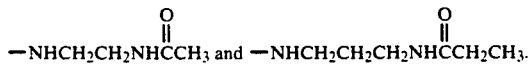

Siloxane polymers which are useful in accordance with the present invention may vary in viscosity and polymerization.

The amine functional polysiloxanes shown in formula (II) which are employed as one of the reactants for the production of the derivatized silicones of the present invention are commercially available materials and are known in the art, and described for example in U.S. Pat. No. 4,559,227 issued Dec. 17, 1985.

In an alternate embodiment of the present invention, derivatized organosilicon compounds can be prepared by reacting either (i) a lactone such as propiolactone, butyrolactone, valerolactone and caprolactone; or (ii) a derivative of carbonic acid such as ethylene carbonate and propylene carbonate; and (iii) an amine functional silane having the formula $$(RO)_3SiR'NHR''  \quad (III)$$

in which R is an alkyl group having one to four carbon atoms; R' is an alkylene group having three to eighteen carbon atoms; and R'' is selected from the group consisting of a hydrogen atom, hydrocarbon radicals free of aliphatic unsaturation and having one to six carbon atoms, and aminoalkyl radicals having two to six carbon atoms. Such silanes as set forth in formula (III) above are also commercially available materials and are known in the art, and described for example in U.S. Pat. No. 3,817,894 issued Jun. 18, 1974.

In a third embodiment of the present invention, derivatized organosilicon compounds can be prepared by reacting a derivative of carbonic acid such as ethylene carbonate and propylene carbonate and an amine functional polysiloxane having the formula $$R'_{3-z}Q_zSiO[R_2'SiO]_xSiQ_zR'_{3-z} \quad (IV)$$

wherein R' denotes an alkyl group of 1 to 4 carbon atoms, OH, an alkoxy group, or a phenyl group, with the proviso that at least one of the R' groups is an alkoxy group; Q denotes an amine functional substituent of the formula —R''Z wherein R'' is a divalent alkylene radical of 3 to 6 carbon atoms or a radical of the formula —CH$_2$CH$_2$CH$_2$OCH$_2$CHOHCH$_2$— and Z is a monovalent radical selected from the group consisting of —NR$_2'''$, —NR'''(CH$_2$)$_n$NR$_2'''$; and $$-NR'''(CH_2)_nN(R''')\overset{O}{\underset{\|}{C}}R''''$$

wherein R''' denotes hydrogen or an alkyl group of 1 to 4 carbons, R'''' denotes an alkyl group of 1 to 4 carbons and n is a positive integer from 2 to 6; z has a value of 0 or 1; and x has an average value of 10 to 3000.

The following examples are set forth for the purpose of further illustrating the various concepts embodied by the present invention.

EXAMPLE I

Three hundred grams of a trimethylsilyl-endcapped dimethylsiloxane copolymer having an average degree of polymerization of four hundred and containing two Mole % MeRSiO where R=—CH$_2$CH(CH$_3$)CH$_2$NH(CH$_2$)$_2$NH$_2$, was combined and reacted with 16.0 grams of propylene carbonate to produce a high viscosity derivatized fluid of approximately 11,720 centipoise. Approximately 5.91 grams of a fluid corresponding to formula (IV) was blended with 2.28 grams of the derivatized aminosilicone fluid described above. A small portion of the mixture was poured into an aluminum dish and allowed to stand at room temperature. After three days, the film was inspected. The film was clear, smooth, and recovered quickly when touched.

EXAMPLE 2

Selected aminosilicone fluids corresponding to formula (II) and having different degrees of polymerization containing two Mole % pendant R groups where R=CH$_2$CH(CH$_3$)CH$_2$NHCH$_2$CH$_2$NH$_2$ were combined with propylene carbonate according to the proportions in Table 1. The mixtures were allowed to react for at least 24 hours while being constantly dispersed on a mixing wheel.

TABLE 1

| Sample | Amino-Silicone | Wt. Amino-Silicone (gm) | Wt. Propylene Carbonate (gm) |
|--------|----------------|-------------------------|------------------------------|
| I      | A              | 250.4                   | 13.60                        |
| II     | A              | 250.6                   | 6.84                         |
| III    | A              | 250.0                   | —                            |
| IV     | B              | 300.0                   | 15.99                        |
| V      | B              | 300.11                  | 8.18                         |
| VI     | B              | 300.0                   | —                            |

Aminosilicone A - Trimethylsilyl-endblocked; DP (avg.) = 100
Aminosilicone B - Trimethylsilyl-endblocked; DP (avg.) = 400

EXAMPLE 3

Approximately 200.02 grams of a trimethylsilyl-endcapped amine-functional polymer corresponding to formula (II) and having an average degree of polymerization of 50; 2 Mole % pendant R groups where R=CH$_2$CH(CH$_3$)CH$_2$NHCH$_2$CH$_2$NH$_2$ was combined with 10.82 grams of propylene carbonate. The mixture was dispersed using a mixing wheel and allowed to react for approximately 16 hours. A portion of the product (125.02 grams) was blended with 90.2 grams of fluid corresponding to formula (IV). Approximately 6.12 grams was incorporated into a polish oil phase consisting of 42.0 grams of kerosene, 3.13 grams Witcamide ® 511, 3.06 grams of a cyclic polydimethylsiloxane, 6.03 grams of silicone rubber powder as a lustering agent, and 30.2 grams of a pre-gelled thickener which was a 10% dispersion of Bentone ® SD-3 in kerosene. While the oil phase was being agitated in an Eppenbach mixer, 210 grams of water was slowly added followed by additional mixing to form a stable, water-in-oil polish formulation.

EXAMPLE 4

The automotive polish described in Example 3 spread easily when applied to a 1991 Black Chevrolet Caprice. Conditions which existed during application of the polish were partly cloudy skies, a light breeze, a car surface temperature of 115° F., an air temperature of 60° F., and 54% relative humidity. After allowing approximately 30 minutes for the polish to dry on the automotive finish, the dried residue was removed with a clean dry cotton towel. The polish buffed out easily producing a dark, glossy and homogeneous polish film.

EXAMPLE 5

Three aliquots of the fluid corresponding to formula (IV) were each reacted with different quantities of propylene carbonate according to the proportions illustrated in Table 2. After allowing a suitable time for the reaction to occur, 0.5 gram portions of each derivatized fluid were transferred to aluminum weighing dishes and allowed to stand at room temperature for 72 hours. An equivalent amount of the fluid corresponding to formula (IV) was also transferred into an aluminum weighing dish to serve as a reference. The appearance was monitored at regular intervals.

TABLE 2

| Sample | Wt. of Fluid (gm) | Wt. Propylene Carbonate (gm) | Product Viscosity (cp) | Appearance |
|---|---|---|---|---|
| A | 250.0 | 9.32 | 164.0 | Less tacky |
| B | 250.0 | 9.73 | 90.5 | Tack free |
| C | 250.0 | 28.99 | 151.5 | Tacky |
| D | 250.0 | — | 43.3 | Tack free |

EXAMPLE 6

This example illustrates the incorporation of the Example 5 material into an oil in water based automotive polish. A small quantity of Sample A was formulated into an oil-in-water based automotive polish according to the composition given in Table 3. The resultant liquid polish was applied to an ASTM panel containing a black lacquer automotive finish. The polish applied easily to the finish and exhibited acceptable rub-out characteristics after being allowed sufficient time to dry. The resultant polish film exhibited a smooth glossy finish to the automotive surface.

TABLE 3

| Polish Ingredients | Wt. (gm) |
|---|---|
| Hoechst Wax S | 9.0 |
| Hoechst Wax E | 3.0 |
| oleic acid | 3.0 |
| mineral spirits | 54.0 |
| kerosene | 35.7 |
| morpholine | 2.4 |
| silicone oil (10,000 cs) | 3.0 |
| water | 144.9 |
| Kaopolite 1152 | 24.0 |
| mineral spirits | 12.0 |
| Sample A | 9.0 |

In the foregoing examples and Tables, it should be noted that in Example 3, WITCAMIDE ® is a trademark of the Witco Corporation and that WITCAMIDE ® 511 is a modified alkanolamide surfactant available from the Witco Corporation Organics Division, New York, N.Y. In the same example, the lustering agent employed was a silicone rubber powder which is described in detail in U.S. Pat. No. 5,025,054 issued Jun. 18, 1991. In Table 4, Kaopolite 1152 is an aluminum silicate abrasive. In the same table, the emulsifying agent employed is the reaction product of oleic acid and morpholine.

The following additional examples are set forth in order to further illustrate the present invention.

EXAMPLE 7

Approximately 12 grams of Sample IV described in Table 1 of Example 2 was blended with 78.6 grams of kerosene, 3 grams of silicone emulsifier and 6 grams of micronized wax Aquabead ® 519. While the oil phase was being agitated via use of an Eppenbach mixer, a separate water phase was prepared containing 164.4 grams of water, 1.5 grams sodium borate-pentahydrate, 3 grams propylene glycol, 1.5 grams Tween ® 20, and 30 grams of Kaopolite 1152. Once uniform, the dispersed water phase was added slowly to the oil phase and homogenized using an Eppenbach mixer. This polish formulation was designated as Polish A. A second polish formulation was prepared in a similar fashion and on the same scale using Sample VI (Table I of Example 2) as a replacement for Sample IV in the formulation. This polish formulation was designated as Polish B.

EXAMPLE 8

This example illustrates the performance improvements realized via derivatization of the amine-functional fluid. Polish samples A and B from Example 7 were applied to the finish of a 1990 rose-colored Dodge Dynasty. Conditions which existed during application of the polish were partly cloudy skies, a light breeze, an air temperature of 57° F., and 49% relative humidity. After allowing approximately 1 hour for the polish to dry, the dried residue was removed with a clean cotton towel. Both polishes were buffed to produce glossy and homogeneous polish films. However, polish A could be buffed with greater ease and produced less dusting and smear than Polish B.

EXAMPLE 9

Approximately 3.3 grams of beta-butyrolactone was combined and reacted with an amine-functional fluid which included hydrolyzable/condensable functional groups on silicon as shown below in which x was between ten and twenty.

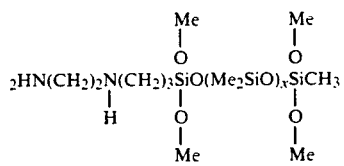

After mixing for approximately 15 minutes at room temperature, the viscosity of the solution was measured using a Brookfield LVT Viscometer and determined to be approximately 88 cps. The mixture was allowed to stir overnight. The viscosity of the product did not change with the additional time given to react. An additional 3.3 grams of 'beta'-butyrolactone was added to the product and the mixture was allowed to mix and react overnight. The viscosity of the resultant product was measured and determined to be 162.5 cps. indicating that further reaction had taken place. Approximately 15 grams of the resultant product was blended with 81 grams kerosene and 3 grams Witcamide ® 511 to produce the oil phase for an automotive polish. While the oil phase was being agitated via use of an Eppenbach mixer, a separate water phase was prepared containing 171 grams of water and 30 grams of Kaopolite SF. Once uniform the dispersed water phase was added slowly to the oil phase and homogenized using an Eppenbach mixer to yield a creamy liquid polish.

EXAMPLE 10

Approximately 23.42 grams propylene carbonate was combined and reacted with 50 grams of an amine-functional silane $RSi(OR')_3$ where $R=CH_2CH_2CH_2NHCH_2CH_2NH_2$ and $R'=CH_3$. A mild exotherm was noted during the reaction. After mixing overnight at ambient temperature, the viscosity was measured using a Brookfield LVT Viscometer. The viscosity of the product was determined to be 1125 cps. compared to 10 cps. for the mixture initially. Approximately 15 grams of the product was blended with 81 grams kerosene and 3 grams Witcamide ® 511 to produce the oil phase for an automotive polish. While the oil phase was being agitated via use of an Eppenbach mixer, a separate water phase was prepared containing 171 grams of water and 30 grams of Kaopolite SF. Once uniform, the dispersed water phase was added slowly to the oil phase and homogenized using an Eppenbach mixer to yield a low viscosity, creamy, liquid polish.

EXAMPLE 11

Approximately 46.8 grams propylene carbonate was combined and reacted with 50 grams of an amine-functional silane $RSi(OR')_3$ where $R=CH_2CH_2CH_2NHCH_2CH_2NH_2$ and $R'=CH_3$. A mild exotherm was noted during the reaction. After mixing overnight at ambient temperature the viscosity was measured using a Brookfield LVT Viscometer. The viscosity of the resultant product was determined to be 237.5 cps., compared to 10 cps. for the mixture initially. Approximately 15 grams of the product was blended with 81 grams kerosene and 3 grams of a silicone emulsifier (75% active in isopropanol) to produce the oil phase for an automotive polish. While the oil phase was being agitated via use of an Eppenbach mixer, a separate water phase was prepared containing 171 grams of water and 30 grams of Kaopolite SF. Once uniform the dispersed water phase was added slowly to the oil phase and homogenized using an Eppenbach Mixer to yield a low viscosity, creamy liquid polish.

In Examples 7–11, the silicone emulsifier was a polydiorganosiloxane-polyoxyalkylene copolymer. Such silicone emulsifiers are commercially available and well known in the art and are shown for example in U.S. Pat. Nos. 3,402,192, 3,928,558, 4,122,029 and 5,008,103. TWEEN ® 20 is a commercially available polyoxyethylene sorbitan monolaurate emulsifier and a trademark of ICI Americas Inc., Wilmington, Del. USA.

While U.S. Pat. No. 4,104,296 issued Aug. 1, 1978 describes reaction products of lactones with certain organosilicon compounds, the '296 patent does not teach the utility of such products in polish formulations. It has been discovered in accordance with the present invention, that polish formulations containing the derivatized amine functional organosilicon compounds of the present invention unexpectedly exhibit an improved compatibility between blends of other organosilicon film formers used in the polish formulation, with the result that polishes in accordance with the present invention possess much less of a tendency to streak in comparison to formulations of the prior art.

With regard to Example 5, it should be noted that U.S. Pat. No. 4,883,854 issued Nov. 28, 1989 relates to other reaction products of ethylene carbonate with certain silicone polymers described in the '854 patent as "polydimethyl siloxane (PDMS) with aminopropyl termination (PDMS diamine) and polyoxypropylene diamines". In contrast, the derivatized amine functional silicone fluid in Example 5 of the present invention includes alkoxy groups which differentiate these fluids from the materials in the '854 patent. Because of the presence of these alkoxy groups, the derivatized fluids of Example 5 are capable of further hydrolysis and condensation to form crosslinked and durable films. No such films can be formed in accordance with the teaching in the '854 patent since the "PDMS" described therein includes no alkoxy group and hence no crosslinking as the materials of Example 5 of the present invention. This crosslinking capability provides the advantage over the prior art that smear resistant polish films may be formed with the formulations of the present invention in comparison to prior art non-crosslinking polish formulations.

Micronized wax particles may be employed in the polish formulations of the present invention and may be made from any conventional wax but preferably micronized particles of Fischer-Tropsch waxes, polyethylene wax, polyethylenepolytetrafluorethylene wax, polytetrafluorethylene wax, polypropylene wax, natural waxes, mineral waxes, montan wax derivatives, fatty acid derivatives, amide waxes and wax mixtures. The particle size of the micronized wax particles may vary from an average diameter of about two microns to about thirty to forty-five microns although particles sizes of from two to five microns are preferred. Such micronized wax particles are manufactured by Micro Powders, Inc., Scarsdale, N.Y. Other micronized wax particles suitable for incorporation into the polish formulations of the present invention are disclosed in U.S. Pat. No. 4,846,887, issued Jul. 11, 1989.

The polish formulations in accordance with the present invention are preferably in the form of an emulsion and include an oil phase containing a solvent, an organosilicon detergent resistant film forming derivatized amine functional compound, a surfactant and a wax. The water phase can include water, an abrasive, a freeze thaw additive such as propylene glycol and sodium borate, and colorants. Water in oil emulsions are preferred however oil in water emulsions are also included herein. It has been found that the polish formulations of the present invention possess the advantage in that the polish is more smear resistant and has less of a tendency to streak in comparison to conventional and prior art polish formulations which do not contain the derivatized polymers.

The polishes of the present invention are of general application including such surfaces as motor vehicles, boats and navigable crafts, wood surfaces, plastic surfaces and fiber surfaces. The films produce a high durable gloss and are easy to apply.

It will be apparent from the foregoing that many other variations and modifications may be made in the structures, compounds, compositions and methods described herein without departing substantially from the essential features and concepts of the present invention. Accordingly it should be clearly understood that the forms of the invention described herein are exemplary only and are not intended as limitations on the scope of the present invention.

What is claimed is:

1. In a polish formulation containing as components thereof at least one member selected from the group consisting of waxes, solvents, surfactants, thickening agents, abrasives, dyes, odorants, detergent resistant additives and corrosion inhibitors the improvement comprising incorporating into the polish formulation a derivatized aminofunctional organosilicon compound, the derivatized aminofunctional organosilicon compound being the reaction product of an amine functional polysiloxane and a derivative of carbonic acid.

2. The polish according to claim 1 in which the carbonic acid derivative is selected from the group consisting of ethylene carbonate and propylene carbonate.

3. The polish according to claim 1 in which the amine functional polysiloxane has the formula

wherein R' denotes an alkyl group of 1 to 4 carbons, OH, an alkoxy group, or a phenyl group, with the proviso that at least 50 percent of the total R' groups are methyl; Q denotes an amine functional substituent of the formula —R"Z, wherein R" is a divalent alkylene radical of 3 to 6 carbon atoms or a radical of the formula —CH$_2$CH$_2$CH$_2$OCH$_2$CHOHCH$_2$— and Z is a monovalent radical selected from the group consisting of —NR$_2$''', —NR'''(CH$_2$)$_n$NR$_2$'''; and

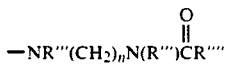

wherein R''' denotes hydrogen or an alkyl group of 1 to 4 carbons, R'''' denotes an alkyl group of 1 to 4 carbons and n is a positive integer from 2 to 6; z has a value of 0 or 1; x has an average value of 10 to 3000; and y has an average value selected from the group consisting of (i) y=0 and (ii) y=1–100.

4. In a polish formulation containing as components thereof at least one member selected from the group consisting of waxes, solvents, surfactants, thickening agents, abrasives, dyes, odorants, and other ingredients normally used in making polishes, the improvement comprising incorporating into the polish formulation a derivatized aminofunctional organosilicon compound, the derivatized aminofunctional organosilicon compound being the reaction product of an amine functional polysiloxane and a lactone.

5. The polish according to claim 4 in which the lactone is selected from the group consisting of propiolactone, butyrolactone, valerolactone and caprolactone.

6. The polish according to claim 4 in which the amine functional polysiloxane has the formula

wherein R' denotes an alkyl group of 1 to 4 carbons, OH, an alkoxy group, or a phenyl group, with the proviso that at least 50 percent of the total R' groups are methyl; Q denotes an amine functional substituent of the formula —R"Z, wherein R" is a divalent alkylene radical of 3 to 6 carbon atoms or a radical of the formula —CH$_2$CH$_2$CH$_2$OCH$_2$CHOHCH$_2$— and Z is a monovalent radical selected from the group consisting of —NR$_2$''', —NR'''(CH$_2$)$_n$NR$_2$'''; and

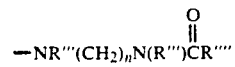

wherein R''' denotes hydrogen or an alkyl group of 1 to 4 carbons, R'''' denotes an alkyl group of 1 to 4 carbons and n is a positive integer from 2 to 6; z has a value of 0 or 1; x has an average value of 10 to 3000; and y has an average value selected from the group consisting of (i) y=0 and (ii) y=1–100.

7. In a polish formulation containing as components thereof at least one member selected from the group consisting of waxes, solvents, surfactants, thickening agents, abrasives, dyes, odorants, and other ingredients normally used in making polishes, the improvement comprising incorporating into the polish formulation a derivatized aminofunctional organosilicon compound, the derivatized aminofunctional organosilicon compound being the reaction product of an amine functional silane and a derivative of carbonic acid.

8. The polish according to claim 7 in which the carbonic acid derivative is selected from the group consisting of ethylene carbonate and propylene carbonate.

9. The polish according to claim 7 in which the amine functional silane has the formula

in which R is an alkyl group having one to four carbon atoms; R' is an alkylene group having three to eighteen carbon atoms; and R" is selected from the group consisting of a hydrogen atom, hydrocarbon radicals free of aliphatic unsaturation and having one to six carbon atoms, and aminoalkyl radicals having two to six carbon atoms.

10. In a polish formulation containing as components thereof at least one member selected from the group consisting of waxes, solvents, surfactants, thickening agents, abrasives, dyes, odorants, and other ingredients normally used in making polishes, the improvement comprising incorporating into the polish formulation a derivatized aminofunctional organosilicon compound, the derivatized aminofunctional organosilicon compound being the reaction product of an amine functional silane and a lactone.

11. The polish according to claim 10 in which the lactone is selected from the group consisting of propiolactone, butyrolactone, valerolactone and caprolactone.

12. The polish according to claim 10 in which the amine functional silane has the formula

in which R is an alkyl group having one to four carbon atoms; R' is an alkylene group having three to eighteen carbon atoms; and R" is selected from the group consisting of a hydrogen atom, hydrocarbon radicals free of aliphatic unsaturation and having one to six carbon atoms, and aminoalkyl radicals having two to six carbon atoms.

* * * * *